(12) United States Patent
Vayssiere et al.

(10) Patent No.: US 11,655,017 B2
(45) Date of Patent: May 23, 2023

(54) STIFFENER SKELETON FOR A FIREWALL ARRANGEMENT OF A ROTARY WING AIRCRAFT

(71) Applicants: AIRBUS HELICOPTERS DEUTSCHLAND GMBH, Donauworth (DE); AIRBUS HELICOPTERS, Marignane (FR)

(72) Inventors: Aurelien Vayssiere, Niederschoenenfeld Ot Feldheim (DE); Nicolas Montil, Saint Chamas (FR); Mathieu Gester, Velaux (FR); Hubert Neukirch, Dillingen (DE); Pascal Jervaise, Gardanne (FR); Markus Kammerer, Alerheim (DE); Pierre Arnould, Salon de Provence (FR)

(73) Assignees: AIRBUS HELICOPTERS DEUTSCHLAND GMBH, Donauworth (DE); AIRBUS HELICOPTERS, Marignane (FR)

( * ) Notice: Subject to any disclaimer, the term of this patent is extended or adjusted under 35 U.S.C. 154(b) by 9 days.

(21) Appl. No.: 17/350,438

(22) Filed: Jun. 17, 2021

(65) Prior Publication Data
US 2022/0161915 A1    May 26, 2022

(30) Foreign Application Priority Data
Nov. 20, 2020   (EP) .................................... 20400021

(51) Int. Cl.
*B64C 1/06*    (2006.01)
*B64C 27/04*   (2006.01)

(52) U.S. Cl.
CPC .............. *B64C 1/061* (2013.01); *B64C 27/04* (2013.01)

(58) Field of Classification Search
CPC .......... B64C 1/061; B64C 27/04; B64C 1/06; B64C 1/062; B64C 1/064; B64C 1/068; B64C 27/00
See application file for complete search history.

(56) References Cited

U.S. PATENT DOCUMENTS

| 2,989,273 | A | * | 6/1961 | Grunfelder | ............. B64C 27/12 244/137.1 |
| 3,166,277 | A | | 1/1965 | Brison et al. | |

(Continued)

FOREIGN PATENT DOCUMENTS

| EP | 2046638 B1 | 9/2010 |
| EP | 2443034 B1 | 9/2015 |

(Continued)

OTHER PUBLICATIONS

European Search Report for European Application No. EP 20400021.0, Completed by the European Patent Office, dated Apr. 27, 2021, 8 pages.

*Primary Examiner* — Joshua J Michener
*Assistant Examiner* — Cindi M Curry
(74) *Attorney, Agent, or Firm* — Brooks Kushman P.C.

(57) ABSTRACT

A stiffener skeleton that is configured to be mounted to an upper deck of a rotary wing aircraft in a maintenance phase, comprising an upper stiffening structure with a plurality of supporting arms for providing upside stiffening support, and a lateral stiffening structure with a plurality of supporting legs for providing lateral stiffening support, wherein the plurality of supporting arms and the plurality of supporting legs form a self-supporting frame structure.

20 Claims, 4 Drawing Sheets

(56) References Cited

U.S. PATENT DOCUMENTS

| | | | | |
|---|---|---|---|---|
| 3,744,743 | A | * | 7/1973 | Nay .................. B64C 27/12 |
| | | | | 244/6 |
| 6,138,949 | A | * | 10/2000 | Manende ............. B64C 1/10 |
| | | | | 244/119 |
| 9,868,545 | B2 | | 1/2018 | Brochard et al. |
| 2009/0314899 | A1 | | 12/2009 | Porte et al. |
| 2012/0082808 | A1 | | 4/2012 | Lemains et al. |
| 2018/0156131 | A1 | | 6/2018 | Olson |
| 2021/0403139 | A1 | * | 12/2021 | Fink .................. B64C 1/16 |

FOREIGN PATENT DOCUMENTS

| | | | |
|---|---|---|---|
| EP | 3056423 | A1 | 8/2016 |
| EP | 2917532 | B1 | 4/2019 |
| EP | 3556661 | A1 | 10/2019 |

* cited by examiner ize helicopter, an associated fuselage typically comprises an upper primary skin that separates an aircraft interior region, which is formed by the fuselage, from an aircraft upper deck arranged above the fuselage. The aircraft interior region usually accommodates at least a cockpit and may further accommodate a cabin for passengers and/or cargo.

STIFFENER SKELETON FOR A FIREWALL ARRANGEMENT OF A ROTARY WING AIRCRAFT

CROSS-REFERENCE TO RELATED APPLICATIONS

This application claims priority to European patent application No. EP 20400021.0 filed on Nov. 20, 2020, the disclosure of which is incorporated in its entirety by reference herein.

TECHNICAL FIELD

The present embodiments are related to a stiffener skeleton that is configured to be mounted to an upper deck of a rotary wing aircraft in a maintenance phase, in particular on a firewall arrangement provided on an upper deck of a rotary wing aircraft.

BACKGROUND

In a rotary wing aircraft, such as a small or medium-size helicopter, an associated fuselage typically comprises an upper primary skin that separates an aircraft interior region, which is formed by the fuselage, from an aircraft upper deck arranged above the fuselage. The aircraft interior region usually accommodates at least a cockpit and may further accommodate a cabin for passengers and/or cargo.

The aircraft upper deck generally includes an engine accommodating region that accommodates one or more engines, typically air breathing gas turbines, and that is, therefore, also referred to as the "engine deck". The one or more engines are adapted for driving the rotary wing aircraft, e.g., by providing power to an associated power distribution unit, such as a gearbox, which then provides this power to a suitable propelling unit, such as e.g., a rotor, propeller or other. Typically, the engines are arranged on the engine deck outside of the aircraft interior region, on top of the fuselage and close to the other main components of a respective powerplant, the main gear box and the main rotor.

According to airworthiness certification regulations the engine deck of a given rotary wing aircraft must be fire proof in a fire event. Therefore, the engine deck as a whole is usually equipped with a suitable firewall arrangement which forms a fire protection zone. The fire protection zone accommodates the engines within the firewall arrangement such that the firewall arrangement defines a fire proof separation between the engines, towards the forward and aft regions of the engine deck and the aircraft interior region formed by the fuselage of a given rotary wing aircraft. The firewall arrangement is further provided to protect a respective environmental control system, a main gear box, and flight controls of the given rotary wing aircraft.

More specifically, a firewall arrangement in an engine deck usually comprises a front firewall as well as a rear firewall, and is typically delimited by the upper primary skin of the fuselage that forms a lower firewall, as well as by a cowling that represents an upper loft of a given rotary wing aircraft and covers the engine deck. If the rotary wing aircraft is a twin-engine aircraft, both engines are usually separated from each other by a center or mid firewall of the firewall arrangement for protecting both engines from each other, such that each engine is arranged in a separate and independently closed engine compartment. The firewall arrangement ensures an air, water, and fluid separation of each engine compartment. Remaining gaps between mobile and fixed parts on the engine deck are hermetically sealed with suitable fire proof seals and/or gaskets.

In any case, the engine(s) is (are) attached to the upper primary skin and corresponding framework members such as beams or frames by means of several engine mounts, and certain parts of the firewall arrangement are generally removable in order to enable access to the engine(s) or other mechanical parts, e.g., in a maintenance phase. The front firewall and the rear firewall represent a barrier to respective front and rear portions of a given aircraft upper deck. The cowling is usually at least partially removable to provide access to the engines, e.g., in a maintenance phase.

Exemplary firewall arrangements are described in the documents EP 2 046 638 B1, EP 2 443 034 B1, EP 2 917 532 B1, U.S. Pat. No. 9,868,545 B2, and US 2018/0156131 A1.

More particularly, the document EP 3 556 661 A1 describes a rotary wing aircraft with an engine compartment that is provided with a firewall arrangement. The firewall arrangement includes a front firewall and a center firewall. The front firewall has an upper firewall portion and a lower firewall portion.

The document EP 3 056 423 A1 describes a rotary wing aircraft with a fuselage that defines at least an interior region and an engine accommodating region that is arranged inside of the fuselage and comprises at least one fire protection zone that is defined by at least one associated firewall arrangement. The at least one fire protection zone accommodates at least one engine within the at least one associated firewall arrangement such that the associated firewall arrangement defines a fire-resistant separation between the at least one engine and the interior region of the fuselage. The at least one associated firewall arrangement comprises a plurality of interconnected firewalls that delimit the at least one fire protection zone, including a front firewall, a rear firewall, a lower firewall, and a mid firewall.

Usually, in such a firewall arrangement the respective front and rear firewalls, as well as mid firewalls, if any, are secondary parts which are typically made of titanium sheet. A typical thickness of such a titanium sheet amounts to 1.2 mm, although fire resistance is already deemed to be achieved with a minimum thickness of 0.4 mm.

More specifically, the front, rear, and mid firewalls, if any, as such are designed to increase the stability of a respective aircraft upper deck secondary structure and to keep a covering cowling in position while the cowling is providing stiffness to the firewalls. The cowling in turn forms a protection of the engine deck and, more generally, of the aircraft upper deck against the external environment of a given rotary wing aircraft as, in closed state, the cowling covers all installations and equipment located on the aircraft upper deck. Furthermore, the cowling improves a respective aerodynamic behaviour of the given rotary wing aircraft due to an underlying shaping, thus, reducing aerodynamic drag, while carrying and transferring all occurring flight loads to a given aircraft primary structure, i.e., a given aircraft airframe. Moreover, the cowling supports and withstands also other loads, such as loads of a given conditioning and ventilation system, air intake protection grids, an engine plenum, and engine exhaust nozzles.

When a given cowling and a respective firewall arrangement with front, rear, and mid firewalls, if any, are assembled and in position in a given rotary wing aircraft, they form a stiff and rigid system. However, upon opening and removing of the given cowling, e.g., in a maintenance phase, the overall stiffness and rigidity of this system is decreased such that the front, rear, and/or mid firewall, or structural parts thereof, may be damaged more easily.

The document U.S. Pat. No. 6,138,949 A describes a rotary wing aircraft with a main rotor support structure that includes fire shields for preventing fire from transmitting from an engine compartment into an adjacent compartment. The fire shields include a plurality of fire panels that are hung from, and threadingly engaged with, associated main beams. The fire panels are made from titanium material and have a thickness of about 0.03 mm. The fire panels are designed to prevent fire transmission, but they are not designed to carry any applied walking loads. Instead, the fire panels are attached to vertical posts through a sliding attachment by means of associated seal plates, which form a stiffening framework such that the fire panels are stiffened and not easily damaged in a maintenance phase. However, the stiffening framework is comparatively bulky and heavy and increases, thus, an overall weight of the rotary wing aircraft.

SUMMARY

It is, therefore, an object of the present disclosure to provide a new stiffening framework for a firewall arrangement provided on an upper deck of a rotary wing aircraft. This object is solved by a stiffener skeleton having the features of claim 1.

More specifically, according to the present disclosure a stiffener skeleton is provided that is configured to be mounted to an upper deck of a rotary wing aircraft in a maintenance phase. The stiffener skeleton comprises an upper stiffening structure with a plurality of supporting arms for providing upside stiffening support, and a lateral stiffening structure with a plurality of supporting legs for providing lateral stiffening support. The plurality of supporting arms and the plurality of supporting legs form a self-supporting frame structure.

The plurality of supporting arms may be formed by three foldable arms or parts, and the plurality of supporting legs may be formed by four foldable legs or parts. The plurality of supporting arms and the plurality of supporting legs may be clipped together, preferably in a releasable manner. The plurality of supporting legs is preferably mountable to an upper deck of a given rotary wing aircraft. In addition, an extension supporting arm may be provided and connected to one of the plurality of supporting arms, preferably in a releasable manner.

By way of example, the stiffener skeleton may be positioned on a firewall arrangement provided on an upper deck of a rotary wing aircraft. Advantageously, the stiffener skeleton may be removed from the firewall arrangement, e.g., upon finalizing a respective maintenance phase, such that the weight of the stiffener skeleton does not increase the overall weight of the rotary wing aircraft in normal operating mode.

Preferably, the firewall arrangement defines a fire proof separation between at least one aircraft engine that is accommodated in an associated engine compartment and other adjacent aircraft regions. Such other adjacent aircraft regions include an aircraft interior region, as well as e.g., an engine compartment(s) of a further aircraft engine(s), and forward and aft regions to the engine accommodating region, such as e.g., gearbox or exhaust accommodating regions. The firewall arrangement may comprise a front firewall, a rear firewall, and a mid firewall.

By positioning the stiffener skeleton on a firewall arrangement provided on an upper deck of a rotary wing aircraft, damage to the front firewall, the rear firewall, and/or the mid firewall and/or, more generally, to structural parts on the upper deck may advantageously be prevented in a maintenance phase, e.g., during engine disassembly. Moreover, a safety hook may be attached to the stiffener skeleton to further secure the stiffener skeleton on the firewall arrangement. The safety hook may e.g., be connected via a rope to a framework in a maintenance hangar. In order to simplify attachment of the safety hook to the stiffener skeleton, a suitable eye or lug may be provided on the stiffener skeleton.

Thus, injury of technicians during the maintenance phase due to damage of the front firewall, the rear firewall, and/or the mid firewall, as well as due to an unsecured stiffener skeleton, may beneficially by prevented. Furthermore, the maintenance phase may be shortened by improving stiffness and rigidity of the firewall arrangement by means of the stiffener skeleton. Thus, respective maintenance costs may advantageously be reduced.

According to one aspect, the stiffener skeleton comprises mounting means that are configured to be fixedly mounted to associated fixation means provided at an upper deck of a rotary wing aircraft.

Preferably, the mounting means are integrated into the plurality of supporting legs.

According to one aspect, the stiffener skeleton comprises lower linking arms that interconnect associated supporting legs of the plurality of supporting legs.

According to one aspect, the upper stiffening structure is attached, preferably detachably, to the lateral stiffening structure in an assembled state, in particular by means of associated snap-fit or clip connections.

According to one aspect, the self-supporting frame structure is foldable.

According to one aspect, the stiffener skeleton comprises a plurality of supporting legs connections that detachably attaches the plurality of supporting legs to the plurality of supporting arms in an assembled state of the stiffener skeleton.

Preferably, at least one of the plurality of supporting legs comprises an associated hinge that enables folding of the at least one of the plurality of supporting legs at least in a disassembled state of the stiffener skeleton.

Preferably, at least one of the plurality of supporting arms comprises an associated hinge that enables folding of the at least one of the plurality of supporting arms at least in a disassembled state of the stiffener skeleton.

According to one aspect, at least one of the plurality of supporting arms comprises an associated hinge that enables folding of the at least one of the plurality of supporting arms in an assembled state of the stiffener skeleton, wherein each one of the lower linking arms comprises an associated hinge that enables folding of the lower linking arms in the assembled state of the stiffener skeleton.

According to one aspect, the stiffener skeleton comprises a plurality of hinges that pivotally connects the plurality of supporting legs to the plurality of supporting arms to enable folding of the plurality of supporting legs toward the plurality of supporting arms in an assembled state of the stiffener skeleton.

According to one aspect, at least two of the plurality of supporting legs and an associated one of the plurality of supporting arms form a C- or U-shaped skeleton section.

According to one aspect, a first and a second leg of the plurality of supporting legs and a first supporting arm of the plurality of supporting arms form a front skeleton section, and a third and a fourth leg of the plurality of supporting legs and a second supporting arm of the plurality of supporting arms form a rear skeleton section, wherein a third supporting arm of the plurality of supporting arms connects the front skeleton section to the rear skeleton section.

According to one aspect, the stiffener skeleton comprises an extension supporting arm that is connected to one of the plurality of supporting arms, in particular by means of an associated hinge.

According to one aspect, the self-supporting frame structure is configured to be arranged in a maintenance phase on a firewall arrangement provided on an upper deck of a rotary wing aircraft for supporting and stiffening at least a front firewall, a rear firewall, and a mid firewall of the firewall arrangement.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
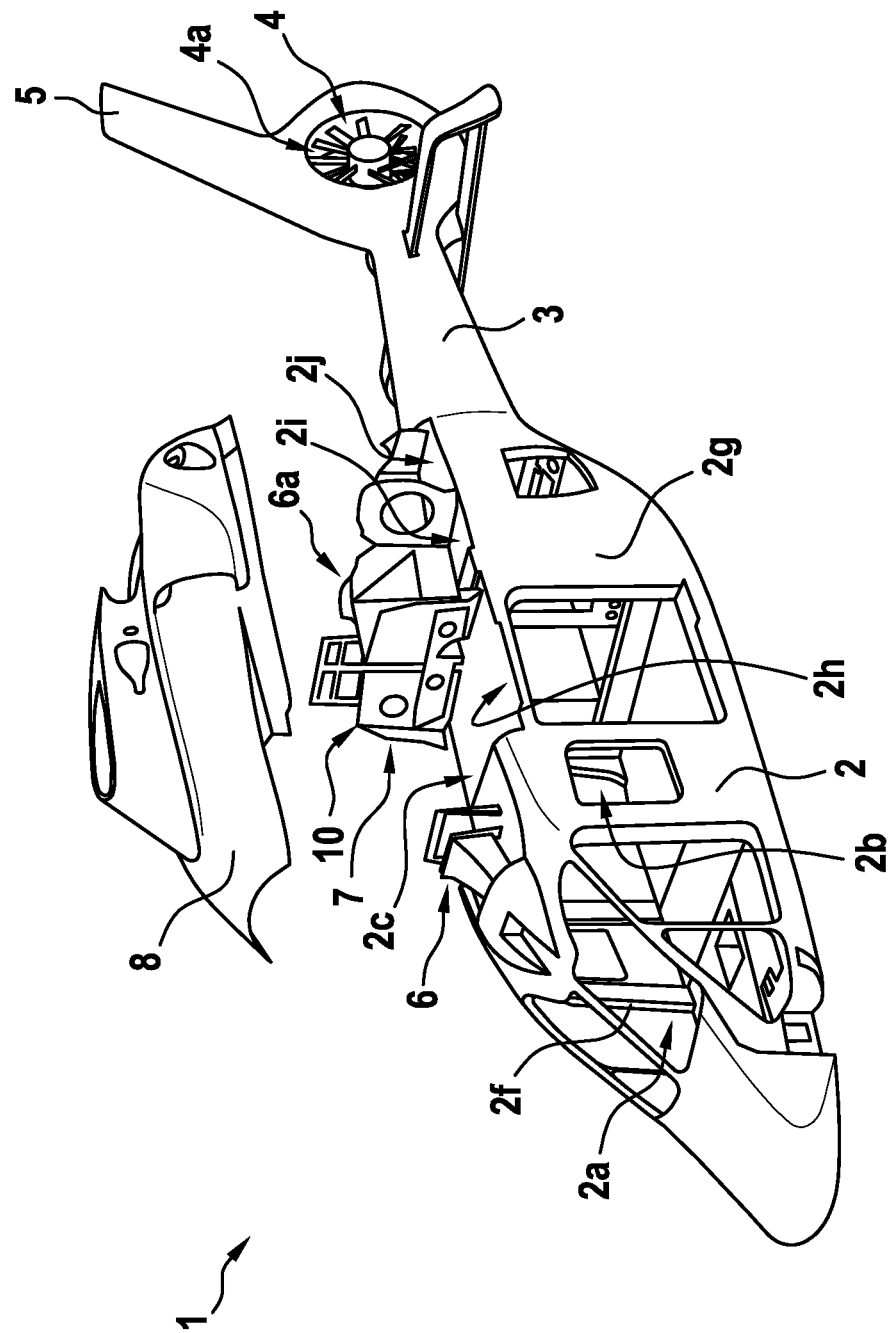
FIG. 1 shows a perspective view of a rotary wing aircraft with an engine accommodating region that is covered by a cowling and provided with a firewall arrangement.

FIG. 1 shows a rotary wing aircraft 1 that is exemplarily illustrated as a helicopter. Thus, for purposes of simplicity and clarity, the rotary wing aircraft 1 is hereinafter referred to as the "helicopter 1".

Preferably, the helicopter 1 comprises at least one multi-blade main rotor for providing lift and forward or backward thrust during operation. The at least one multi-blade main rotor preferentially comprises a plurality of rotor blades that are mounted at an associated rotor head to a rotor shaft, which rotates in operation of the helicopter around an associated rotor axis. Furthermore, the helicopter 1 comprises a landing gear, such as e.g., a skid-type or wheel-type landing gear. However, for simplicity and clarity of the drawing, illustration of the at least one multi-blade main rotor and the landing gear, as well as of other components that would only unnecessarily complicate the drawing, is omitted.

The helicopter 1 illustratively comprises a fuselage 2 that forms an aircraft interior region 2a, 2b. The aircraft interior region 2a, 2b preferably accommodates at least a cockpit 2a and may further accommodate a cabin 2b for passengers and/or cargo. By way of example, a tail boom 3 is connected to the fuselage 2 of the helicopter 1.

The helicopter 1 illustratively further comprises at least one preferentially shrouded counter-torque device 4 configured to provide counter-torque during operation, i.e., to counter the torque created by rotation of the at least one multi-blade main rotor for purposes of balancing the helicopter in terms of yaw. The at least one counter-torque device 4 is illustratively provided at an aft section of the tail boom 3 and preferably comprises a tail rotor 4a. The aft section of the tail boom 3 preferably further comprises a fin 5.

According to one aspect, the fuselage 2 comprises an upper primary skin 2c that separates the aircraft interior region 2a, 2b from an aircraft upper deck 6 arranged above the fuselage 2. In other words, the upper primary skin 2c forms an upper end of the fuselage 2.

Illustratively, the upper primary skin 2c includes a front deck skin 2h, an engine deck skin 2i, and a rear deck skin 2j. The engine deck skin 2i is associated with an engine deck 6a that is part of the aircraft upper deck 6 and that illustratively forms an engine accommodating region 7 with a firewall arrangement 10. Preferably, the aircraft upper deck 6 and, more particularly, at least the engine deck 6a is covered by a cowling 8 that is mounted on top of the fuselage 2.

Preferably, the fuselage 2 includes side shells 2f, 2g which illustratively encase the aircraft interior region 2a, 2b and which are mounted to interconnected frames and longitudinal beams to form a primary structure of the helicopter 1 that is designed and adapted for global load carrying duties. Thus, the fuselage's upper primary skin 2c is also involved in these global load carrying duties and, consequently, contributes to global load carrying of the fuselage 2.

Figure 2:
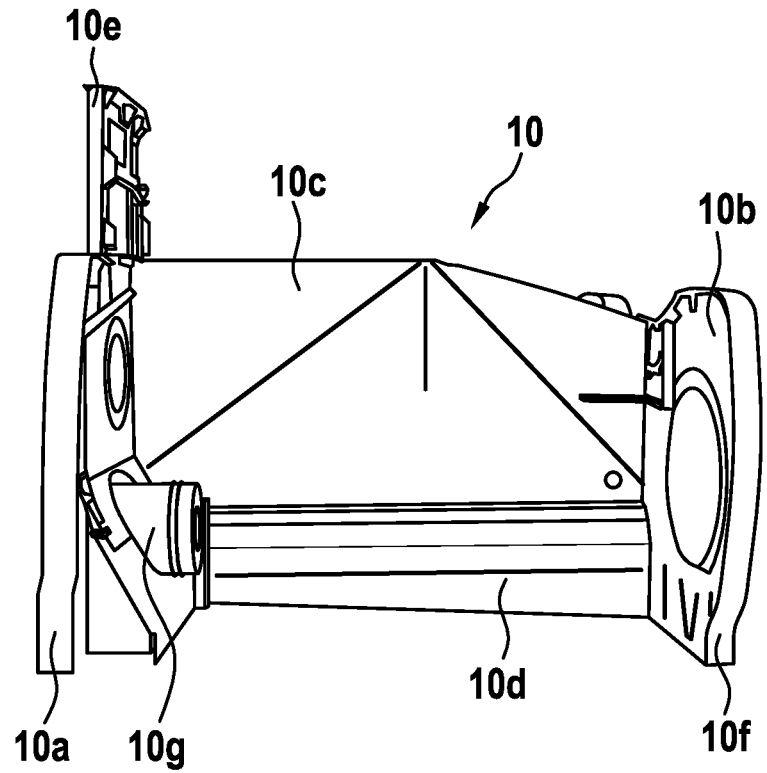
FIG. 2 shows a lateral view of the firewall arrangement of FIG. 1.

FIG. 2 shows the firewall arrangement 10 of FIG. 1, which preferably includes at least a front firewall 10a and a rear firewall 10b. Illustratively, the firewall arrangement 10 further includes a mid firewall 10c. Preferably, each one of the front firewall 10a, the rear firewall 10b, and the mid firewall 10c comprises a fire proof material, including at least one of titanium, steel, ceramics, a polymeric composite, or a hybrid organic-inorganic composite. In one realization, at least one of the front firewall 10a, the rear firewall 10b, or the mid firewall 10c has a titanium sheet with a minimum thickness of at least 0.4 mm, preferably with a thickness in a range from 0.6 mm to 0.8 mm, preferentially with a thickness of 1.2 mm.

By way of example, the mid firewall 10c, but also the front firewall 10a and the rear firewall 10b, form a channel 10d that is adapted for accommodating at least partly a tail rotor drive shaft passing through the engine deck 6a of FIG. 1. Furthermore, the front firewall 10a is illustratively provided with an upper extension 10e and the rear firewall 10b is provided with a rear cover 10f. Moreover, a gasket 10g is integrated into the front firewall 10a by way of example.

Figure 3:
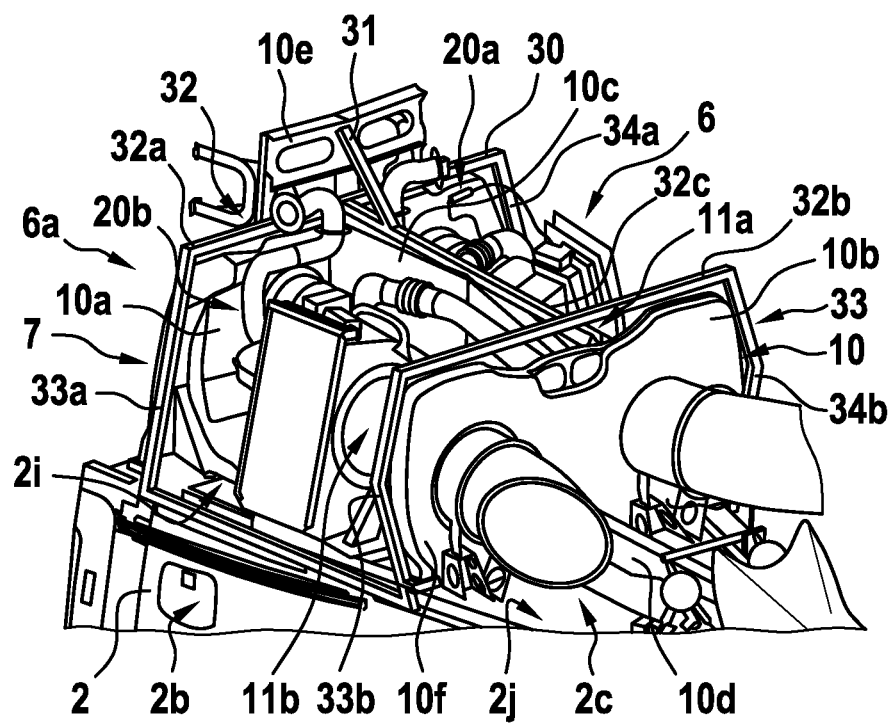
FIG. 3 shows a perspective view of the engine accommodating region of FIG. 1 that is provided with a stiffener skeleton for stiffening the firewall arrangement of FIG. 1 and FIG. 2, without the cowling of FIG. 1.

FIG. 3 shows the engine deck 6a of FIG. 1, which is part of the aircraft upper deck 6 of the helicopter 1 of FIG. 1 and which forms the engine accommodating region 7 with the firewall arrangement 10 of FIG. 1 and FIG. 2. The firewall arrangement 10 illustratively includes the front firewall 10a, the rear firewall 10b, the mid firewall 10c, the channel 10d, the upper extension 10e, and the rear cover 10f according to FIG. 2, while the gasket 10g is not visible in FIG. 3.

As described above at FIG. 1, the engine deck 6a is arranged above the fuselage 2 of FIG. 1. By way of example, the front and rear firewalls 10a, 10b delimit the engine deck 6a, i.e., the engine accommodating region 7, in longitudinal direction of the helicopter 1 of FIG. 1. According to one aspect, the engine accommodating region 7 accommodates at least one aircraft engine within the firewall arrangement 10 such that the firewall arrangement 10 defines a fire proof separation at least between the at least one aircraft engine and the aircraft interior region (2a, 2b in FIG. 1).

More generally, the firewall arrangement 10 preferably defines a fire proof separation between the at least one aircraft engine and other adjacent aircraft regions. Such other adjacent aircraft regions include the aircraft interior region (2a, 2b in FIG. 1), as well as e.g., an engine compartment(s) of a further aircraft engine(s), and forward and aft regions to the engine accommodating region 7, such as e.g., gearbox or exhaust accommodating regions.

Illustratively, the engine accommodating region 7 accommodates two aircraft engines 11a, 11b within the firewall arrangement 10, which are separated from each other by means of the mid firewall 10c of the firewall arrangement 10. Each aircraft engine 11a, 11b is preferably arranged in an associated engine compartment 20a, 20b. By way of example, two adjacent engine compartments 20a, 20b are provided and the aircraft engine 11a is arranged in the engine compartment 20a and the aircraft engine 11b is arranged in the engine compartment 20b.

Preferably, the two aircraft engines 11a, 11b are embodied as air breathing propulsion gas turbines, which combust a fuel/air mix for power generation. Furthermore, each aircraft engine 11a, 11b is preferably mounted to associated engine mounts provided in the associated engine compartment 20a, 20b. However, the aircraft engines 11a, 11b and the associated engine mounts are not described in detail. In fact, the aircraft engines 11a, 11b and the associated engine mounts may be implemented by engines and engine mounts that are well-known to the person skilled in the art so that a detailed description thereof can be omitted, for brevity and conciseness.

According to one aspect, the two aircraft engines 11a, 11b and, thus, the two adjacent engine compartments 20a, 20b are covered by the cowling 8 of FIG. 1 in mounted state of the cowling 8. Nevertheless, in FIG. 3 the cowling 8 is not shown for illustrating a dismounted state of the cowling 8, which may e.g., be required to enable removal of one of the two aircraft engines 11a, 11b from its associated engine compartment 20a, 20b. However, as long as the cowling 8 is removed from the engine compartments 20a, 20b and, more generally, from the engine deck 6a as illustrated in FIG. 3, e.g., during a maintenance phase, the firewall arrangement 10 requires a stiffening support in order to prevent besides others damage to the firewall arrangement 10 during the maintenance phase.

According to one aspect, such a stiffening support may be provided by means of a stiffener skeleton 30. Illustrative realizations of the stiffener skeleton 30 are described in detail below at FIG. 4 to FIG. 7.

Preferably, the stiffener skeleton 30 is configured to be mounted to the engine deck 6a and, more generally, to the aircraft upper deck 6 in a maintenance phase. In other words, the stiffener skeleton 30 may be removed from the aircraft upper deck 6 after the maintenance phase and is, thus, not permanently installed on the aircraft upper deck 6.

More specifically, the stiffener skeleton 30 preferably comprises at least an upper stiffening structure 32 with a plurality of supporting arms 32a, 32b, 32c for providing upside stiffening support, and a lateral stiffening structure 33 with a plurality of supporting legs 33a, 33b, 34a, 34b for providing lateral stiffening support. As the supporting legs 33a, 33b, 34a, 34b are intended to provide lateral stiffening support, they are also referred to as the "lateral supporting legs 33a, 33b, 34a, 34b". The stiffener skeleton 30 may further comprise an extension supporting arm 31 that is connected to one of the plurality of supporting arms 32a, 32b, 32c, illustratively to the supporting arm 32c.

By way of example, the extension supporting arm 31 forms a stiffening support for the upper extension 10e of the firewall arrangement 10. Furthermore, the lateral supporting legs 33a, 34a and the supporting arm 32a form a stiffening support for the front firewall 10a of the firewall arrangement 10, and the lateral supporting legs 33b, 34b and the supporting arm 32b form a stiffening support for the rear firewall 10b of the firewall arrangement 10. Moreover, the supporting arm 32c forms a stiffening support for the mid firewall 10c of the firewall arrangement.

Figure 4:
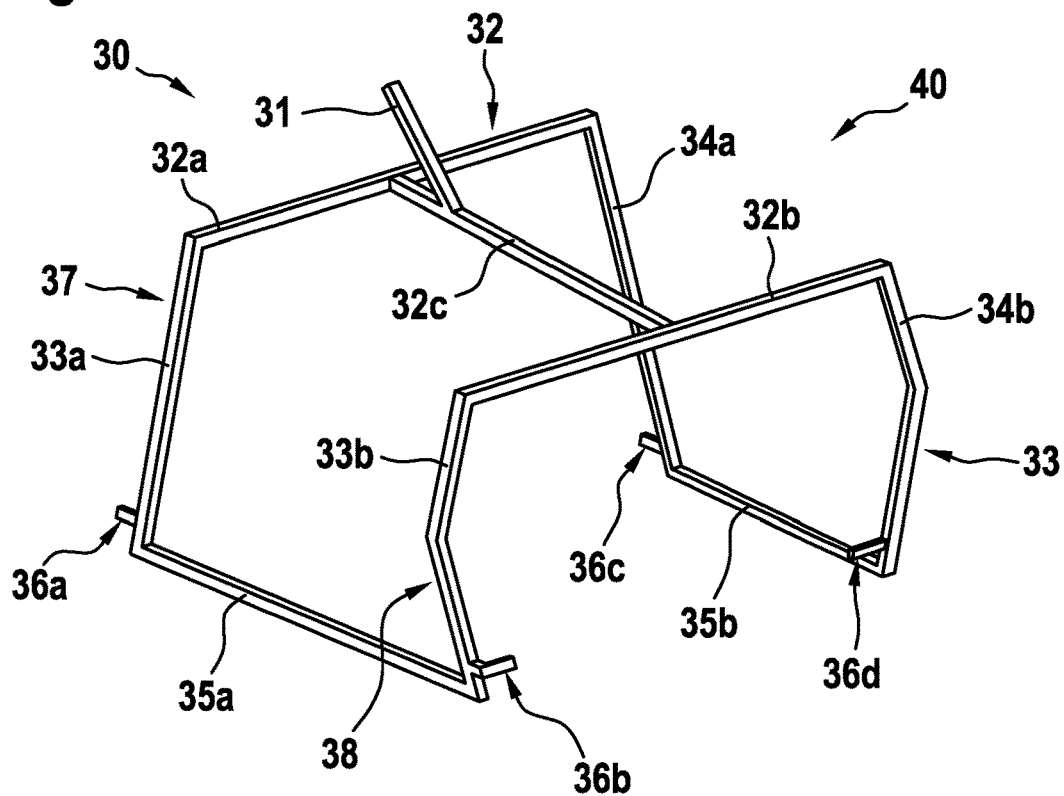
FIG. 4 shows a perspective view of the stiffener skeleton of FIG. 3 according to one embodiment.

FIG. 4 shows the stiffener skeleton 30 of FIG. 3 with the upper stiffening structure 32 and the lateral stiffening structure 33. The upper stiffening structure 32 has the plurality of supporting arms 32a, 32b, 32c and the lateral stiffening structure 33 has the plurality of lateral supporting legs 33a, 33b, 34a, 34b.

According to one aspect, the plurality of supporting arms 32a, 32b, 32c and the plurality of lateral supporting legs 33a, 33b, 34a, 34b form a self-supporting frame structure 40. Preferably, this self-supporting frame structure 40 is configured to be arranged in a maintenance phase on the firewall arrangement 10 provided on the upper deck 6 of the rotary wing aircraft 1 of FIG. 1 for supporting and stiffening at least the front firewall 10a, the rear firewall 10b and the mid firewall 10c of the firewall arrangement 10 of FIG. 1 to FIG. 3.

In order to enable mounting of the stiffener skeleton 30 e.g., to the upper deck 6 of the rotary wing aircraft 1 of FIG. 1, suitable mounting means 36a, 36b, 36c, 36d may be provided. These mounting means 36a, 36b, 36c, 36d are preferably configured to be fixedly mounted to associated fixation means, such as e.g., already existing engine mounts, provided at the upper deck 6 of the rotary wing aircraft 1. By way of example, the mounting means 36a, 36b, 36c, 36d are integrated into the plurality of lateral supporting legs 33a, 33b, 34a, 34b.

Illustratively, at least two of the plurality of lateral supporting legs 33a, 34a, 33b, 34b and an associated one of the plurality of supporting arms 32a, 32b, 32c form a C- or U-shaped skeleton section. By way of example, the lateral supporting legs 33a, 34a and the supporting arm 32a form a front skeleton section 37, and the lateral supporting legs 33b, 34b and the supporting arm 32b form a rear skeleton section 38. Illustratively, the front skeleton section 37 is connected to the rear skeleton 38 via the supporting arm 32c. The front and rear skeleton sections 37, 38 are preferably C- or U-shaped.

According to one aspect, the supporting arms 32a, 32b are connected to each other by means of the supporting arm 32c. Thus, the supporting arms 32a, 32b, 32c illustratively form an H-shaped structure. By connecting the supporting arms 32a, 32b to each other by means of the supporting arm 32c, the front and rear skeleton sections 37, 38 are likewise connected to each other.

In addition, two optional lower linking arms 35a, 35b of the stiffener skeleton 30 preferably interconnect associated lateral supporting legs of the plurality of lateral supporting legs 33a, 33b, 34a, 34b. Illustratively, the optional lower linking arm 35a interconnects the lateral supporting legs 33a, 33b, and the optional lower linking arm 35b interconnects the lateral supporting legs 34a, 34b.

The stiffener skeleton 30 further comprises the extension supporting arm 31 of FIG. 3. As described above, the extension supporting arm 31 is connected to the supporting arm 32c.

Preferably, at least the extension supporting arm 31, the supporting arms 32a, 32b, 32c and the lateral supporting legs 33a, 33b, 34a, 34b, but preferentially also the optional lower linking arms 35a, 35b and the mounting means 36a, 36b, 36c, 36d, are formed by rods, bars or beams. They may be made from any material that is suitable for stiffening and rigidifying at least the firewall arrangement 10 of FIG. 1 to FIG. 3, such as e.g., metal or steel.

According to one aspect, and as illustrated by way of example in FIG. 4, at least the extension supporting arm 31, the supporting arms 32a, 32b, 32c and the lateral supporting legs 33a, 33b, 34a, 34b, but preferentially also the optional lower linking arms 35a, 35b and the mounting means 36a, 36b, 36c, 36d, are durably mounted to each other in an assembled state of the stiffener skeleton 30, i.e., rigidly attached to or integrally formed with each other to build up the self-supporting frame structure 40 such that at least a quick and easy disassembling of the stiffener skeleton 30 is disabled. However, in alternative realizations at least a partial quick and easy disassembling and/or folding of the stiffener skeleton 30 may be enabled, e.g., when the stiffener skeleton 30 is not in use or for transportation purposes, as explained by way of example below at FIG. 5 to FIG. 7.

Figure 5:
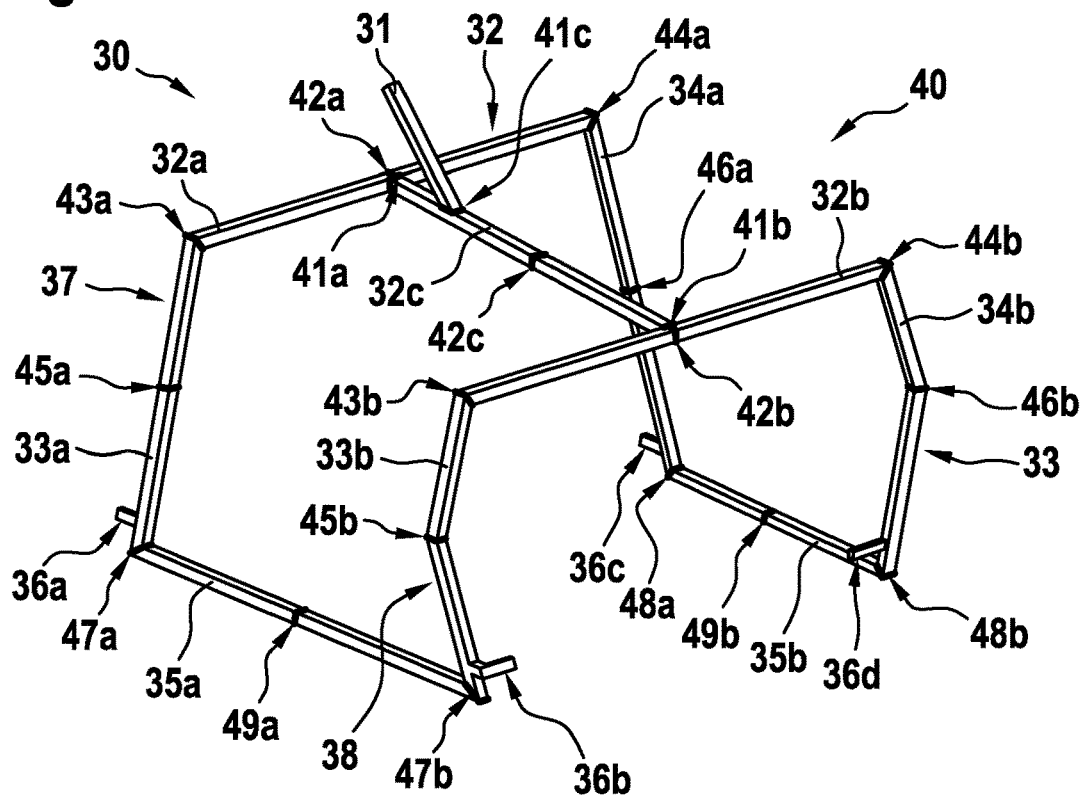
FIG. 5 shows a perspective view of the stiffener skeleton of FIG. 4 according to another embodiment.

FIG. 5 shows the stiffener skeleton 30 of FIG. 4 with the extension supporting arm 31, the upper stiffening structure 32 having the plurality of supporting arms 32a, 32b, 32c, the lateral stiffening structure 33 having the plurality of lateral supporting legs 33a, 33b, 34a, 34b, the lower linking arms 35a, 35b, and the mounting means 36a, 36b, 36c, 36d. As described above, the lower linking arms 35a, 35b are optional and may, thus, be omitted.

However, in contrast to FIG. 4 the upper stiffening structure 32 is now detachably attached to the lateral stiffening structure 33 in the assembled state. Likewise, the lower linking arms 35a, 35b are also detachably attached to the lateral stiffening structure 33. The detachable attachment of the upper stiffening structure 32 and the lower linking arms 35a, 35b to the lateral stiffening structure 33 is illustratively realized via a plurality of lateral supporting legs connections 43a, 43b, 44a, 44b and lower linking arms connections 47a, 47b, 48a, 48b.

Furthermore, also in contrast to FIG. 4, the upper stiffening structure 32 as such may now be disassembled. Therefore, the supporting arms 32a, 32b of the plurality of supporting arms 32a, 32b, 32c of the upper stiffening structure 32 are now detachably attached to the supporting arm 32c in the assembled state via associated upper supporting arms connections 41a, 41b. Similarly, the supporting arm 32c is now detachably attached to the extension supporting arm 31 via an upper supporting arms connection 41c.

Preferably, at least a quick and easy disassembling of the stiffener skeleton 30 is enabled by implementing at least the lateral supporting legs connections 43a, 43b, 44a, 44b as snap-fit or clip connections. Similarly, the lower linking arms connections 47a, 47b, 48a, 48b and/or the upper supporting arms connections 41a, 41b, 41c may also be implemented as snap-fit or clip connections.

Moreover, also in contrast to FIG. 4, the supporting arms 32a, 32b, 32c of the upper stiffening structure 32, the lateral supporting legs 33a, 33b, 34a, 34b of the lateral stiffening structure 33 and/or the lower linking arms 35a, 35b may be foldable, at least in a disassembled state of the stiffener skeleton 30. This may be achieved by providing the supporting arms 32a, 32b, 32c with associated upper supporting arms hinges 42a, 42b, 42c, the lateral supporting legs 33a, 33b, 34a, 34b with associated lateral supporting legs hinges 45a, 45b, 46a, 46b and/or the lower linking arms 35a, 35b with associated lower linking arms hinges 49a, 49b.

Figure 6:
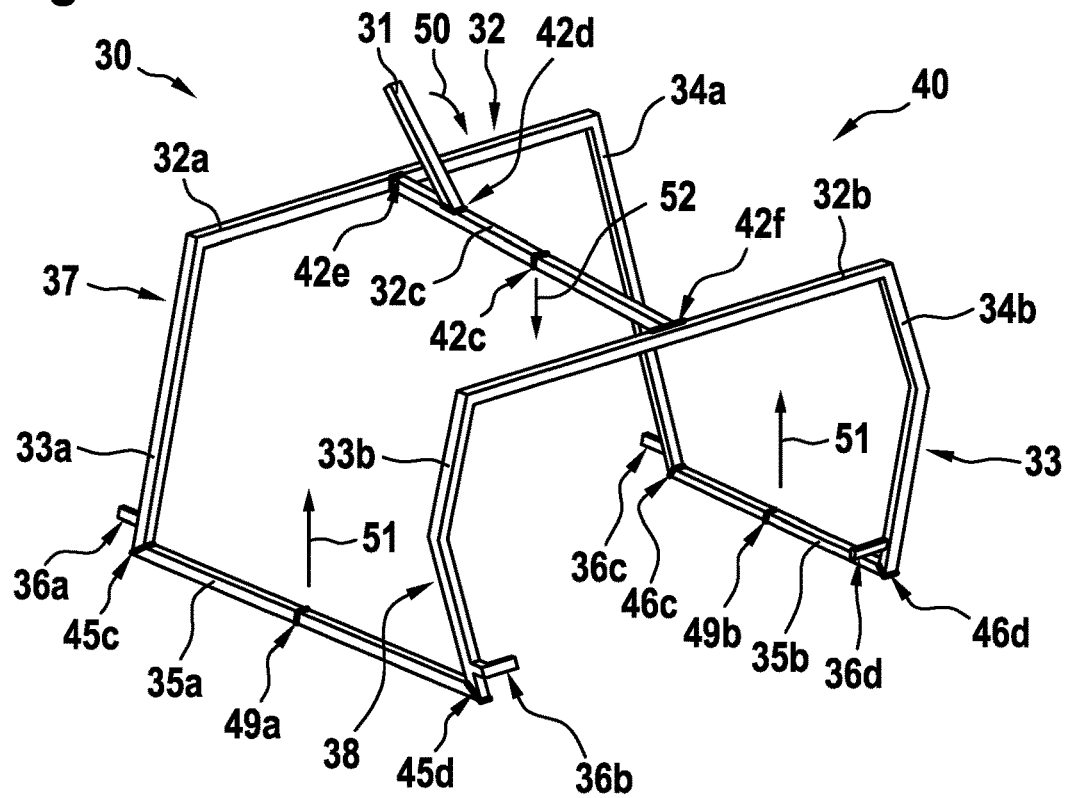
FIG. 6 shows a perspective view of the stiffener skeleton of FIG. 4 according to still another embodiment.

FIG. 6 shows the stiffener skeleton 30 of FIG. 4 with the front and rear skeleton sections 37, 38. According to FIG. 4, the stiffener skeleton 30 is formed with the extension supporting arm 31, the upper stiffening structure 32 having the plurality of supporting arms 32a, 32b, 32c, the lateral stiffening structure 33 having the plurality of lateral supporting legs 33a, 33b, 34a, 34b, the lower linking arms 35a, 35b, and the mounting means 36a, 36b, 36c, 36d. As described above, the lower linking arms 35a, 35b are optional and may, thus, be omitted.

However, in contrast to FIG. 4, the stiffener skeleton 30, which forms the self-supporting frame structure 40, is now foldable in an assembled state of the stiffener skeleton 30. More specifically, the supporting arm 32c is now preferably connected to the extension supporting arm 31 via an associated upper supporting arms hinge 42d, and to the supporting arms 32a, 32b via associated upper supporting arms hinges 42e, 42f, and is provided with the upper supporting arms hinge 42c according to FIG. 5. Furthermore, the lower linking arms 35a, 35b are now preferably connected to the lateral supporting legs 33a, 33b, 34a, 34b via associated lateral supporting legs hinges 45c, 45d, 46c, 46d, and they are provided with the lower linking arms hinges 49a, 49b according to FIG. 5.

By moving the extension supporting arm 31 in a direction indicated by an arrow 50 around the upper supporting arms hinge 42d, the extension supporting arm 31 is folded towards the supporting arm 32c. Furthermore, by moving the upper supporting arms hinge 42c in a direction indicated by an arrow 52 and the lower linking arms hinges 49a, 49b into a direction indicated by arrows 51, the rear skeleton section 38 is folded towards the front skeleton section 37.

Figure 7:
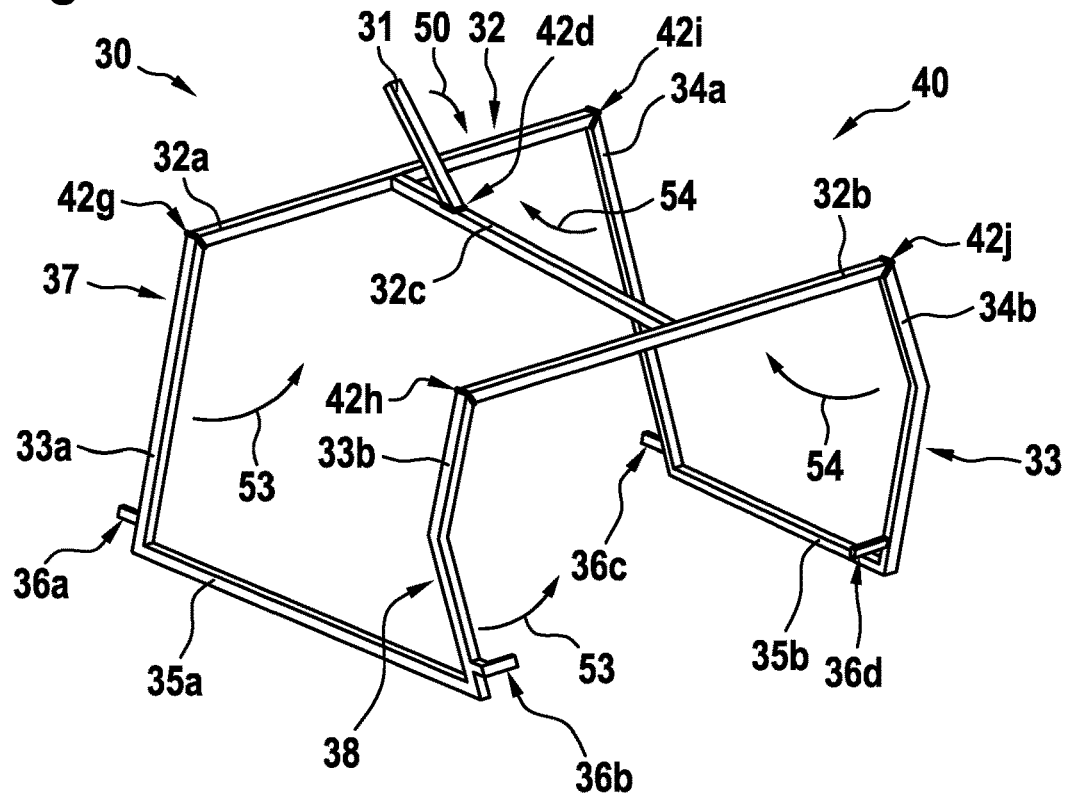
FIG. 7 shows a perspective view of the stiffener skeleton of FIG. 4 according to still another embodiment.

FIG. 7 shows the stiffener skeleton 30 of FIG. 4 with the front and rear skeleton sections 37, 38. According to FIG. 4, the stiffener skeleton 30 is formed with the extension supporting arm 31, the upper stiffening structure 32 having the plurality of supporting arms 32a, 32b, 32c, the lateral stiffening structure 33 having the plurality of lateral supporting legs 33a, 33b, 34a, 34b, the lower linking arms 35a, 35b, and the mounting means 36a, 36b, 36c, 36d. As described above, the lower linking arms 35a, 35b are optional and may, thus, be omitted.

However, in contrast to FIG. 4, the stiffener skeleton 30, which forms the self-supporting frame structure 40, is now again foldable in an assembled state of the stiffener skeleton 30. More specifically, the supporting arm 32c is now preferably connected to the extension supporting arm 31 via the associated upper supporting arms hinge 42d according to FIG. 5, and the lateral supporting legs 33a, 33b, 34a, 34b are now preferably connected to the supporting arms 32a, 32b via associated upper supporting arms hinges 42g, 42h, 42i, 42j.

By moving the extension supporting arm 31 in a direction indicated by the arrow 50 of FIG. 6 around the upper supporting arms hinge 42d, the extension supporting arm 31 is folded towards the supporting arm 32c. Furthermore, by moving the lateral supporting legs 33a, 33b together with the lower linking arm 35a in a direction indicated by an arrow 53, the lateral supporting legs 33a, 33b and the lower linking arm 35a are folded towards the upper stiffening structure 32. Moreover, by moving the lateral supporting legs 34a, 34b together with the lower linking arm 35b in a direction indicated by an arrow 54, the lateral supporting legs 34a, 34b and the lower linking arm 35b are likewise folded towards the upper stiffening structure 32.

It should be noted that modifications to the above described embodiments are within the common knowledge of the person skilled in the art and, thus, also considered as being part of the present disclosure. For instance, a safety hook may be attached to the stiffener skeleton 30 of FIG. 3 to FIG. 7 to further secure the stiffener skeleton 30 e.g., during mounting on the firewall arrangement 10 of FIG. 1 to FIG. 3. In order to enable attachment of the safety hook to the stiffener skeleton, a suitable eye or lug may be mounted to the stiffener skeleton. Furthermore, the length of one or more of the plurality of supporting arms 32a, 32b, 32c of the upper stiffening structure 32 according to any one of FIG. 3 to FIG. 7 may be adjustable, e.g., using a suitable length adjustment device, and so on.

It should further be noted that the drawings are only intended for schematically representing embodiments of the present disclosure and not for showing detailed constructions thereof.

REFERENCE LIST 1 rotary wing aircraft
2 fuselage
2a cockpit
2b cabin
2c upper primary skin of fuselage
2f, 2g fuselage side shells
2h front deck skin
2i engine deck skin
2j rear deck skin
3 tail boom
4 counter-torque device
4a tail rotor
5 fin
6 aircraft upper deck
6a engine deck
7 engine accommodating region
8 cowling
10 firewall arrangement
10a front firewall
10b rear firewall
10c mid firewall
10d tail rotor drive shaft channel
10e front firewall upper extension
10f rear cover
10g gasket
11a, 11b aircraft engines
20a, 20b engine compartments
30 stiffener skeleton
31 upper extension supporting arm
32 upper stiffening structure
32a, 32b, 32c upper supporting arms
33 lateral stiffening structure
33a, 33b lateral supporting legs
34a, 34b lateral supporting legs
35a, 35b lower linking arms
36a, 36b, 36c, 36d skeleton mounting means
37 front skeleton section
38 rear skeleton section
40 self-supporting frame structure
41a, 41b, 41c upper supporting arms connections
42a, 42b, 42c, 42d, 42e, 42f, 42g, 42h, 42i, 42j upper supporting arms hinges
43a, 43b lateral supporting legs connections
44a, 44b lateral supporting legs connections
45a, 45b, 45c, 45d lateral supporting legs hinges
46a, 46b, 46c, 46d lateral supporting legs hinges
47a, 47b lower linking arms connections
48a, 48b lower linking arms connections
49a, 49b lower linking arms hinges
50, 51, 52, 53, 54 folding directions

What is claimed is:

1. A stiffener skeleton that is configured to be mounted to an upper deck of a rotary wing aircraft in a maintenance phase, comprising:
    an upper stiffening structure with a plurality of supporting arms for providing upside stiffening support; and
    a lateral stiffening structure with a plurality of supporting legs for providing lateral stiffening support;
    wherein the plurality of supporting arms and the plurality of supporting legs form a self-supporting frame structure; and
    wherein the self-supporting frame structure is configured to be arranged in the maintenance phase on a firewall arrangement provided on an upper deck of a rotary wing aircraft for supporting and stiffening at least a front firewall, a rear firewall, and a mid firewall of the firewall arrangement.

2. The stiffener skeleton of claim 1 further comprising mounting means that are configured to be fixedly mounted to an upper deck of a rotary wing aircraft.

3. The stiffener skeleton of claim 2 wherein the mounting means are integrated into the plurality of supporting legs.

4. The stiffener skeleton of claim 1 further comprising lower linking arms that interconnect associated supporting legs of the plurality of supporting legs.

5. The stiffener skeleton of claim 1 wherein the upper stiffening structure is attached to the lateral stiffening structure in an assembled state.

6. The stiffener skeleton of claim 5, wherein the upper stiffening structure is detachably attached to the lateral stiffening structure in an assembled state.

7. The stiffener skeleton of claim 1 wherein the self-supporting frame structure is foldable.

8. The stiffener skeleton of claim 1 further comprising a plurality of supporting legs connections that detachably attaches the plurality of supporting legs to the plurality of supporting arms in an assembled state of the stiffener skeleton.

9. The stiffener skeleton of claim 8 wherein at least one of the plurality of supporting legs comprises an associated hinge that enables folding of the at least one of the plurality of supporting legs at least in a disassembled state of the stiffener skeleton.

10. The stiffener skeleton of claim 8 wherein at least one of the plurality of supporting arms comprises an associated hinge that enables folding of the at least one of the plurality of supporting arms at least in a disassembled state of the stiffener skeleton.

11. The stiffener skeleton of claim 1 wherein at least one of the plurality of supporting arms comprises an associated hinge that enables folding of the at least one of the plurality of supporting arms in an assembled state of the stiffener skeleton, and wherein each one of the lower linking arms comprises an associated hinge that enables folding of the lower linking arms in the assembled state of the stiffener skeleton.

12. The stiffener skeleton of claim 1 further comprising a plurality of hinges that pivotally connects the plurality of supporting legs to the plurality of supporting arms to enable folding of the plurality of supporting legs toward the plurality of supporting arms in an assembled state of the stiffener skeleton.

13. The stiffener skeleton of claim 1 wherein at least two of the plurality of supporting legs and an associated one of the plurality of supporting arms form a C- or U-shaped skeleton section.

14. The stiffener skeleton of claim 1 wherein a first and a second leg of the plurality of supporting legs and a first supporting arm of the plurality of supporting arms form a front skeleton section, wherein a third and a fourth leg of the plurality of supporting legs and a second supporting arm of the plurality of supporting arms form a rear skeleton section, and wherein a third supporting arm of the plurality of supporting arms connects the front skeleton section to the rear skeleton section.

15. The stiffener skeleton of claim 1 further comprising an extension supporting arm that is connected to one of the plurality of supporting arms.

16. The stiffener skeleton of claim 15, wherein the extension supporting arm is connected to one of the plurality of supporting arms by means of an associated hinge.

17. The stiffener skeleton of claim 16, wherein the upper stiffening structure is attached to the lateral stiffening structure in an assembled state and wherein the upper stiffening structure is detachably attached to the lateral stiffening structure in an assembled state.

18. The stiffener skeleton of claim 16, further comprising an extension supporting arm that is connected to one of the plurality of supporting arms, wherein the extension supporting arm is connected to one of the plurality of supporting arms by means of an associated hinge.

19. A stiffener skeleton configured to be removable mounted to an upper deck of a rotary wing aircraft in a maintenance phase, the stiffening skeleton comprising:
   an upper stiffening structure with a plurality of supporting arms for providing upside stiffening support; and
   a lateral stiffening structure connected to the upper stiffening structure, the lateral stiffening structure having a plurality of supporting legs for providing lateral stiffening support;
   wherein the plurality of supporting arms and the plurality of supporting legs cooperate together to form a self-supporting frame structure configured to be removably arranged in the maintenance phase on a firewall arrangement provided on an upper deck of a rotary wing aircraft for supporting and stiffening a front firewall, a rear firewall, and a mid firewall of the firewall arrangement.

20. The stiffener skeleton of claim 19 further comprising mounting means configured to be fixedly mounted to an upper deck of a rotary wing aircraft, wherein the mounting means are integrated into the plurality of supporting legs, and further comprising lower linking arms that interconnect associated supporting legs of the plurality of supporting legs.

* * * * *